United States Patent [19]

Wada et al.

[11] 4,025,957
[45] May 24, 1977

[54] MAGNETIC RECORDING SYSTEM USING MAGNETIC TAPE

[75] Inventors: Tasaku Wada; Satoru Nakabo, both of Tokyo, Japan

[73] Assignee: Kokusai Denshin Denwa Kabushiki Kaisha, Japan

[22] Filed: Oct. 15, 1975

[21] Appl. No.: 622,471

[30] Foreign Application Priority Data

Oct. 15, 1974 Japan .............................. 49-118477
Nov. 13, 1974 Japan .............................. 49-130006

[52] U.S. Cl. ................................. 360/48; 360/101
[51] Int. Cl.² .................... G11B 5/09; G11B 21/02
[58] Field of Search ....................... 360/48, 52, 101

[56] References Cited
UNITED STATES PATENTS

| | | | |
|---|---|---|---|
| 2,986,725 | 5/1961 | Dirks | 360/101 |
| 3,484,769 | 12/1969 | Willcox et al. | 360/52 |
| 3,631,427 | 12/1971 | Hein | 360/52 |
| 3,772,664 | 11/1973 | Schlickeiser | 360/52 |
| 3,838,449 | 9/1974 | Sims, Jr. | 360/52 |

*Primary Examiner*—Vincent P. Canney
*Attorney, Agent, or Firm*—Robert E. Burns; Emmanuel J. Lobato; Bruce L. Adams

[57] ABSTRACT

A magnetic recording system using a magnetic tape, in which information codes are recorded on a wider magnetic tape, block by block, in its transverse width dimension by reciprocating a magnetic head along the magnetic tape widthwise thereof so as to correspond with the shift direction of a secondary memory of the information codes. Indication bits are added to each block of the information codes to indicate the sweep direction of the magnetic tape by said magnetic head. Input codes are applied to the secondary memory through a primary memory. Each block of readout information codes is temporarily stored in the primary memory in accordance with states of the indication bits added to the block of readout information codes in the right or left direction so as to meet with the readout sweep direction of the magnetic head. The readout information codes are obtained from the secondary memory. A line printer may be provided to couple with the secondary memory.

5 Claims, 9 Drawing Figures

MAGNETIC RECORDING SYSTEM USING MAGNETIC TAPE

FIELD OF THE INVENTION

This invention relates to a magnetic recording and reproducing device using a magnetic tape.

BRIEF DESCRIPTION OF THE PRIOR ART

In the case of recording information signals on a magnetic tape or like record medium, it is the practice in the prior art to record them successively in the lengthwise direction of the magnetic tape. In block transmission such as data communication signals, however, an interrecord gap is provided between adjacent block code, so that the conventional method does not make full use of the magnetic tape.

BRIEF SUMMARY OF THE INVENTION

To eliminate the above defects of the conventional devices, an apparatus was proposed in U.S. Pat. No. 2.986,725 in which a magnetic head is reciprocally driven along the widthwise direction of a magnetic tape while the magnetic tape is fed in the lengthwise direction by a step-by-step driving mechanism. Accordingly, a particular block of information can be much more rapidly sensed than when the information is recorded in the conventional lengthwise direction. In this conventional apparatus, however, since information is recorded or reproduced only when the magnetic head is driven in the forward direction of the reciprocal drive directions, the backward direction of the reciprocal drive directions is not utilized to record or reproduce information in this apparatus.

An object of this invention is to provide a magnetic recording and reproducing device, in which the forward and backward directions of the reciprocal drive directions are both utilized to record or reproduce information, thereby providing for enhanced reliability of mechanical operation in addition to further improvement of the access time to a particular address.

BRIEF DESCRIPTION OF THE DRAWINGS

The principle, construction and operation of this invention will be clearly understood from the following detailed description taken in conjunction with the accompanying drawings, in which.

DETAILED DESCRIPTION OF THE INVENTION

Figure 1:
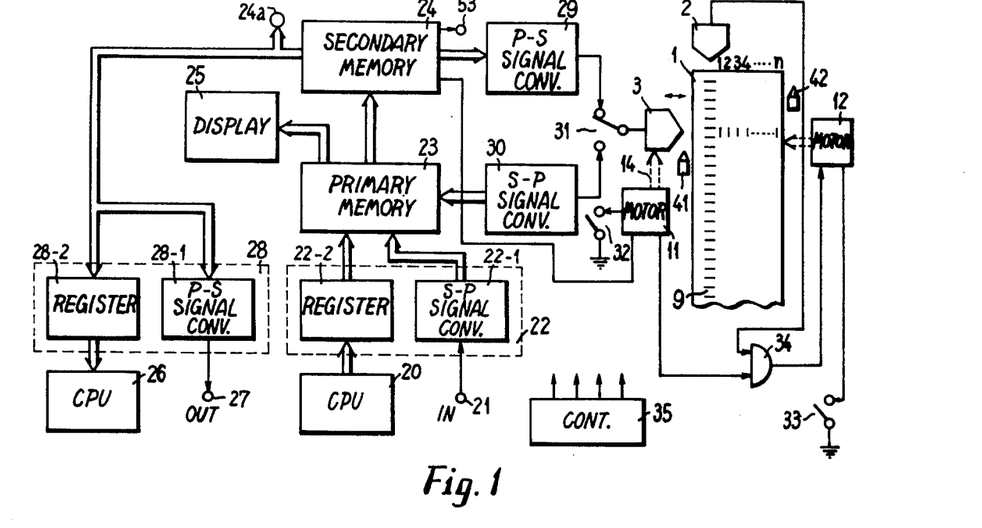
FIG. 1 is a block diagram illustrating an example of this invention.

With reference to FIG. 1, reference numeral 1 indicates a tape-typed record medium such as a magnetic tape of wide width, on which address codes 9 are previously recorded at the edge portion thereof at regular intervals for controlling write and record addresses of information words 7. Reference numeral 2 designates an address read head for reading out the address codes 9; 3 identifies a write/read head for writing and reading of information codes; 11 denotes a magnetic head drive mechanism for driving the head 3, which is, for example, a servo motor. Reference numeral 12 represents a record medium drive mechanism, such as a stepping motor, for feeding the record medium 1 in a forward or backward lengthwise direction; 14 and 17 show mechanical couplers which drive the record medium 1 and the head 3 by the motors 12 and 11 respectively; 20 refers to a computer or a keyboard; 21 identifies a serial signal input terminal; and 22 designates an input code control circuit, which comprises a serial-parallel signal converter 22-1 and a register 22-2 of one character. Input codes of serial signal configuration from the input terminal 21 are converted by the serial-parallel signal converter 22-1 into parallel signal configuration, while parallel codes from the computer 20 are applied to the register 22-2 of one character. Output codes from the signal converter 22-1 and the register 22-2 are applied to a primary memory 23. This primary memory 23 comprises right-left shift registers of one scanning line of information or one information block for temporarily storing in parallel signal configuration the output codes from the input code control circuit 22 or codes read out by the head 3 and applied through a serial-parallel signal converter 30. Reference numeral 24 identifies a secondary memory, which comprises right-left shift registers each having the same bit capacity as the registers of the primary memory 24. The secondary memory 24 further comprises registers for storing indication bits to indicate the right shift direction and the left shift direction as mentioned below. Reference numeral 25 represents a character display; 26 shows an electronic computer; 27 refers to an output terminal of output codes of serial signal configuration; and 28 identifies an output control circuit, which is composed of a register 28-2 and a parallel-serial signal converter 28-1. Reference numeral 35 designates a common control circuit which performs sweep control, control of the storage order of codes in the primary memory 23 and reading control of the codes from the secondary memory 24 when the write read head 3 is driven to reciprocate in a transverse direction of the record medium to write codes in the record medium 1 or read out the recorded codes therefrom.

Input codes applied in the serial signal configuration from the terminal 21 or in the parallel signal configuration from the computer 20 through the serial-parallel signal converter 22-1 or the register 22-2 of the input code control circuit 22 are successively stored in the primary memory 23. At the same time, these codes are displayed on the character display 25. When the input codes of one line are stored in the primary memory 23 or when a line feed code is applied thereto, all the codes stored in the primary memory 23 are transferred to the secondary memory 24. At the same time when the codes have been transferred to the secondary memory 24, the magnetic head driving mechanism 11 starts to drive the magnetic head 3 in the left to right direction or vice versa. The codes stored in the secondary memory 24 are applied in the serial signal configuration to the magnetic head 3 through the parallel-serial signal converter 29 and a switch 31, whose tongue T is held on the side W. At this time, the position and the travel direction of the magnetic head 3 are detected by detectors 41 and 42. In a case where the magnetic head 3 travels in the left to right direction, the codes stored in the secondary memory 24 are read out in the left to right direction in view of the outputs of the detectors 41, 42. In a case where the magnetic head 3 travels in the right to left direction, the codes stored in the secondary memory 24 are read out in the right to left direction in view of the outputs of the detectors 41, 42. Details of this operation will be described below. And the codes are recorded by the magnetic head 3 on the record medium 1. Upon completion of writing of these codes, a pulse from the magnetic head drive mechanism 11 and an address code from the address read head 2 control through a gate 34 the record medium drive mechanism 12 so as to feed the record medium 1 to the next recording position. A switch 32 is employed to start reading of the codes recorded on the record medium 1, and a switch 33 is provided for manually feeding the record medium 1.

Next, in case of reading out the information signal 7 from the record medium 1, the tongue T of the switch 31 is held of the side R and, by closing the switch 32, the magnetic head drive mechanism 11 starts to drive the magnetic head 3 through the coupler 14, so that the head 3 travels in the left to right direction or vice versa, thus reading out the information signal 7 from the record medium 1. The readout codes are applied to the serial-parallel signal converter 30, in which the codes in the serial signal configuration is converted into the parallel signal configuration, which converted codes are successively stored in the primary memory 23. In this case, travelling of the magnetic head 3 in the left to right direction or vice versa is indicated by the indication bits or by the detectors 41 and 42. When the information signal is read out in the left to right direction, the readout codes are successively stored in the primary memory 23 in the left to right direction, as will be described in detail below. Conversely, when the information signal is read out in the right to left direction, the readout codes are successively stored in the primary memory 23 in the right to left direction. When codes of parallel signal configuration of one line are stored in the primary memory 23 or when a line feed code is applied thereto, all the codes stored in the primary memory 23 are transferred to the secondary memory 24. When the codes are transferred to the secondary memory 24, they are transmitted to the outside from the terminal 27 after converted into codes of the serial signal configuration by the parallel-serial signal converter 28-1 of the output control circuit 28, or they are transmitted, as they are, to the electronic computer 26 or the like through the register 28-2.

As described above, this invention is such a system that character codes of one line or of one block in data communication are recorded in one line on the record medium 1 in its widthwise or transverse forward and backward directions or reproduced therefrom by driving the magnetic head 3 to reciprocate in the widthwise direction of the record medium 1. And reproducing can be performed regardless of the directions of recording.

Figure 2A:
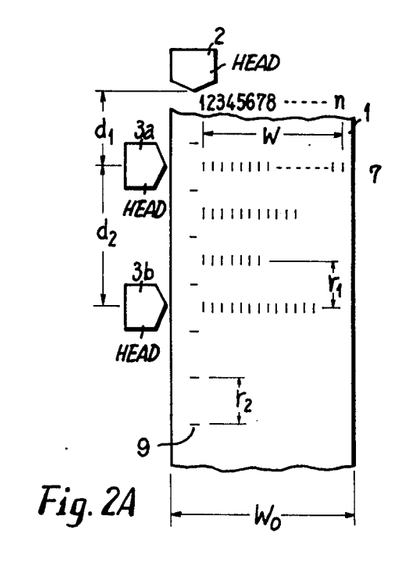
FIGS. 2A and 2B are plan views each illustrating an example of magnetic records according to this invention.
Figure 2B:
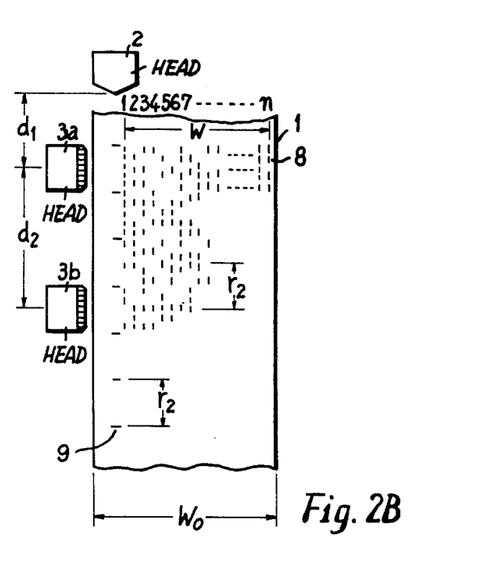

FIGS. 2A and 2B are diagrams showing examples of magnetic records according to this invention. FIGS. 2A and 2B show examples of records of serial and parallel signals, respectively. Now, a description will be mainly given of FIG. 2A, while the description can be substantially applied to FIG. 2B. In FIGS. 2A and 2B, different heads 3b, 3a are employed for write and read, respectively. References $r_1$ in FIG. 2A and $r_2$ in FIG. 2B indicate the row pitch.

The width of the record medium 1 is taken as $W_0$ and the width of recording of the information codes 7 is taken as W. The address codes 9 are previously recorded at the left edge part at regular intervals on the magnetic record medium 1 in its lengthwise direction for indicating the address (positions) of records, by which the write and read positions of the information signal 7 are identified. The intervals of the address signal 9 are indicated by a reference $r_1$ which is the same as the row pitch. The distance $d_1$ between the address code read head 2 and the information signal read head 3a is selected so that when the address code read head 2 reads out the address code 9, the information signal read head 3a reaches a predetermined position. An information signal write head 3b is spaced apart from the information signal read head 3a at a distance $d_2$ which is an integral multiple of the row pitch $r_1$ of the address codes 9.

The order of writing and reading of the information codes 7 is controlled by the common control circuit 35 in FIG. 1 to be exactly identical with the order of codes recorded on the magnetic medium 1 and the order of codes stored in the primary memory 23 and the secondary memory 24, regardless of the code order based on the lateral reciprocal movement of the write and read heads 3b and 3a.

Figure 3:
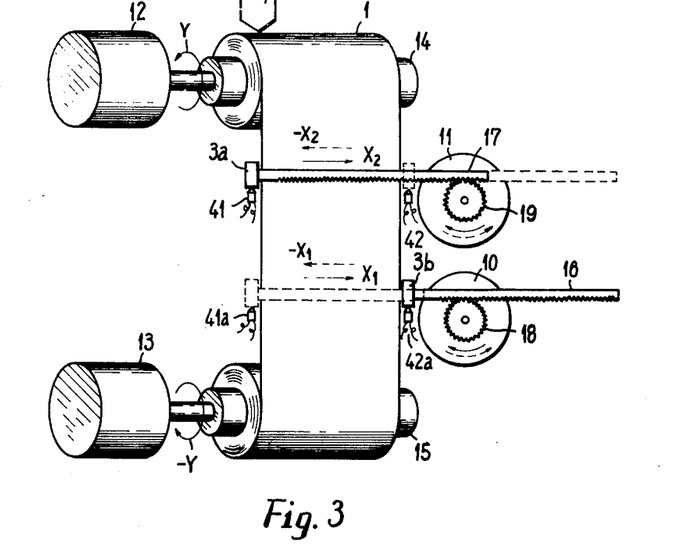
FIG. 3 is a perspective view illustrating a mechanical part employed in this invention.

FIG. 3 shows the construction of the mechanical part of the magnetic recording and reproducing device of this invention. The record medium 1 is wound on shafts 14 and 15, respectively, and these shafts are respectively coupled with shafts of motors 12 and 13, so that the record medium is fed by the motor 12 in the direction Y or by the motor 13 in the direction −Y. The position of this tape 1 is controlled by the address code read head 2. The lateral reciprocating motion of the write head 3b is performed by the cooperation of a gear 18 with a rack 16 having fixed thereto the write head 3b, which is based on the reversible rotation of a servo motor 10. The operation range of the write head 3b is defined by detectors 41a and 42a. When an information code is applied to the write head 3b during its reciprocating motion, the code is recorded on the record medium 1 in the forward direction $X_1$, or the backward direction $-X_1$. The lateral reciprocating motion of the read head 3a is performed by the cooperation of a gear 19 with a rack 17 having fixed thereto the write head 3a, which is based on the reversible rotation of a servo motor 11. The operation range of the read head 3a defined by detectors 41 and 42. During the reciprocating motion, the read head 3a reads out the information codes recorded on the record medium 1 in the forward direction $X_2$ or the backward direction $-X_2$.

Figure 4:
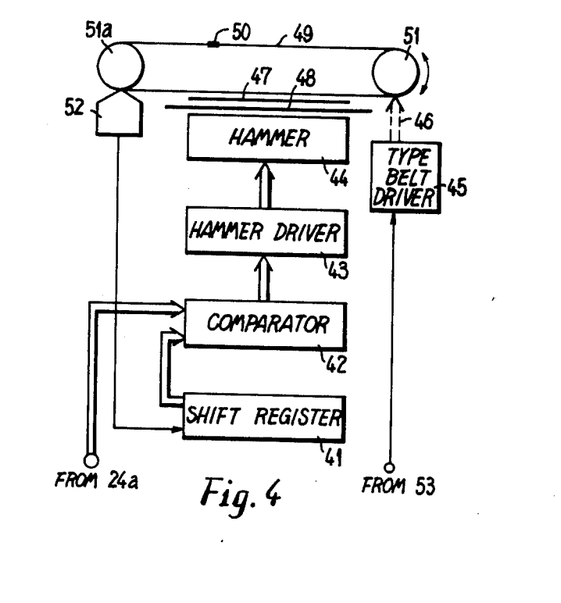
FIG. 4 is a block diagram illustrating a modified part for use in conjunction with the example shown in FIG. 1.

With reference to FIG. 4, a modification of the invention will hereinafter be described. In FIG. 1, a printing mechanism assembly combined with the system of this invention comprises a type belt 49, both ends of which are joined together as indicated by a reference numeral 50 to form a loop, a type hammer mechanism 44, thereby printing types in lines on a record paper 47 through an ink ribbon 48.

This modification further comprises a right-left shift register 41, comparators 42, a hammer driver 43, a type belt driver 45, pulley 51 and 51a, and a type position detector 52. At the same time when the codes from the input are stored in the secondary memory 24, its output pulse is applied through a line 53 to a type belt drive mechanism 45 to start it and, further, applied to the magnetic head drive mechanism head drive mechanism 11 as mentioned above, thus driving a type belt 49 and the magnetic head 3 to reciprocate them in the left to right direction or vice versa. With the movement of the type belt 49 of the printing mechanism assembly to its typing position, the typing position detector 52 generates shift pulses, which are applied to the right-left shift register 41 to shift the contents of it. Collation of shift codes from the right-left shift register 41 with the codes stored in the secondary memory 24 is carried out, code by code, in comparators 42 and when the both codes are coincident with each other at respective type positions, the hammer drive circuit 43 controls the hammer mechanism 44 to perform line printing.

In the case of reading out the information signal 7, at the same time that the codes are transferred to the secondary memory 24, its output is applied through the line 53 to the type belt drive mechanism 45 to reciprocate the type belt 49, thus performing line printing in the aforesaid order of operations.

Figure 5:
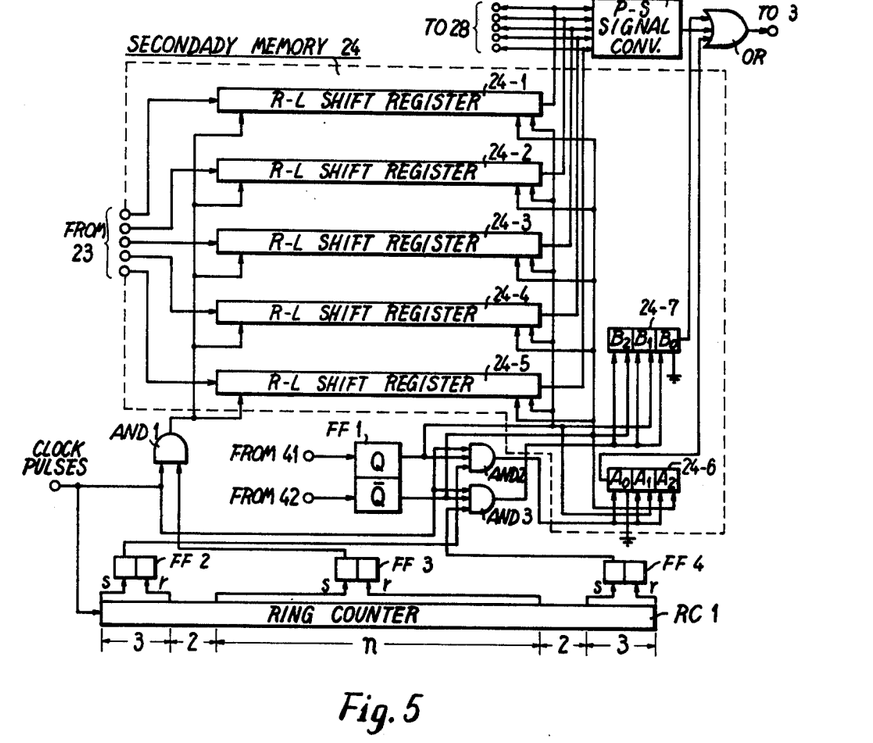
FIG. 5 is a block diagram illustrating more concrete examples of a secondary memory and peripheral circuits employed in this invention.

A more concrete description of the construction and operation of the secondary memory 24 will be made with reference to FIGS. 5 and 6 together with a description of the peripheral circuits 29, 3 and 35. In FIG. 5, the secondary memory 24 comprises five right-left shift registers 24-1, 24-2, 24-3, 24-4 and 24-5 for handling input codes of five unit parallel code configuration from the primary memory 23. Registers 24-6 and 24-7 are employed for generating indication bits $A_0$, $A_1$ and $A_2$ and indication bits $B_0$, $B_1$ and $B_2$ respectively to designate the travelling direction of the write/read magnetic head 3 in accordance with output conditions of the detectors 41 and 42. A ring counter RC1 has a scale of $(3 + 2 + n + 2 + 3)$ as shown and counts clock pulses generated by the control circuit 35. A flipflop circuit FF1 is set by the output of the detector 41 and reset by the output of the detector 42. Flip-flop circuits FF2, FF3 and FF4 are set by corresponding output terminals s of the ring counter RC1 and reset by corresponding output terminals r of the ring counter RC1.

In operation, if the write/read magnetic head 3 starts the left to right sweep of the magnetic tape 1, the detector 41 generates a pulse to set the flip flop FF1. The set output Q of the flip flop circuit FF1 is applied to bits $A_1$ and $B_1$ of the registers 24-6 and 24-7 to indicate states "1" and "1" of the bits $A_1$ and $B_1$. Bits $A_0$ and $B_0$ of the registers 24-6 and 24-7 are always set to the states "1" and "1" by ground. Since the flip-flop circuit FF2 is set by the setting to the state "1" of the left most bit of the ring counter RC1 and reset by the counting of the scale of 3 in the ring counter RC1, and AND gate AND2 passes three clock pulses to the register 24-6 as shift pulses, so that bits $A_0$, $A_1$ and $A_2$ are generated in the states "110" to be applied to the head 3 through an OR gate OR. After two zero bits during the reset time of the flip-flop circuit FF2, the flip-flop circuit FF3 is set to open and AND gate AND1 and then reset after n-bits to close the AND gate AND1. Accordingly, n-clock pulses pass through the opened AND gate AND1 to shift the shift registers 24-1 to 24-5 in a direction (e.g. left to right) indicated by the output states Q and $\overline{Q}$ of this case, so that n-parallel codes are successively read out from the shift registers 24-1 to 24-5 and recorded on the magnetic tape 1 through the OR gate OR and the head 3 after converted being to the serial signal configuration in the parallel to serial signal converter 29. At the same time, codes from the primary memory 23 are stored in the shift registers 24-1 to 24-5. After two zero bits during the reset time of the flip-flop circuit FF3, the flip-flop circuit FF4 is set to open an AND gate AND3 and the reset after three bits to close the AND gate AND3. Accordingly, bits $B_2$, $B_1$ and $B_0$ are generated from the register 24-7 in the states "011" to be applied to the head 3 through the OR gate OR. In other words, a pulse train (1) shown in FIG. 6 is recorded in the magnetic tape 1 in the left to right direction in response to the left to right sweep of the magnetic head 3. At the last of the left to right sweep of the magnetic head 3, the detector 42 generates a pulse so that the flip-flop circuit FF1 is reset.

Figure 6:
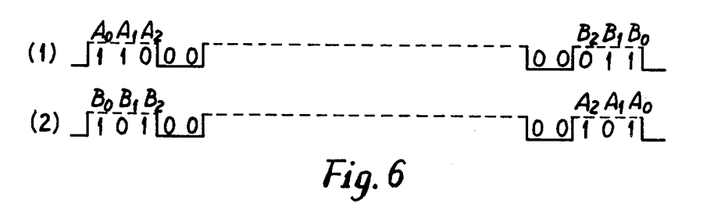
FIG. 6 shows time charts explanatory of the operation of the example shown in FIG. 5.

When the magnetic head 3 then travels from the right to left direction, a pulse train (2) shown in FIG. 6 is stored in the magnetic tape 1 under control of the reset state of the flip flop circuit FF1. In this case, indication bits $B_0$, $B_1$ and $B_2$ and indication bits $A_2$, $A_1$ and $A_0$ assume the states "101" and "101" as shown. Operations of this case can be readily understood by analogy with the above operation, details thereof are omitted.

Figure 7:
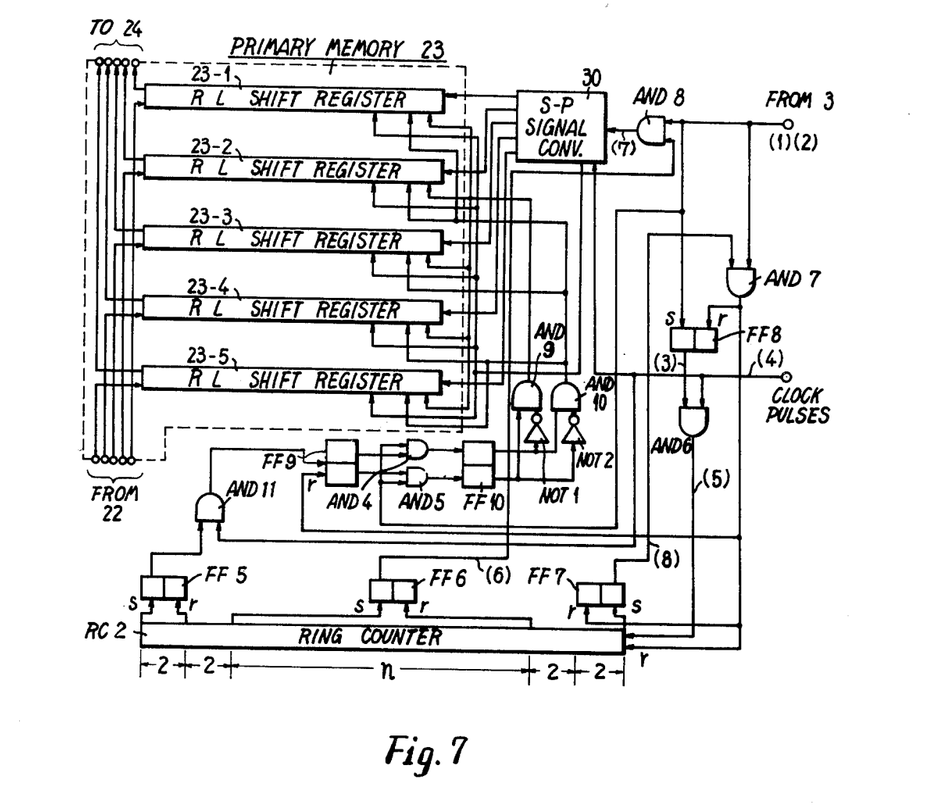
FIG. 7 is a block diagram illustrating more concrete examples of a primary memory and peripheral circuits employed in this invention.
Figure 8:
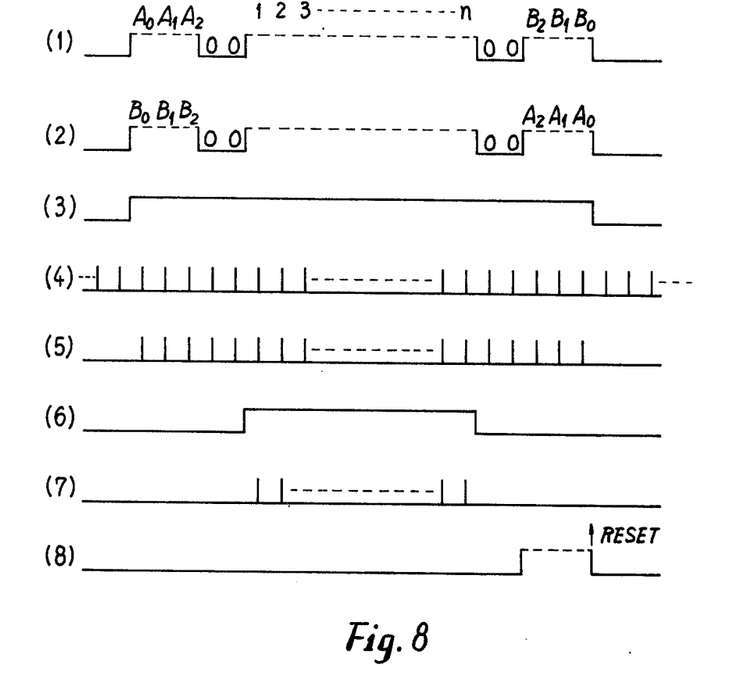
FIG. 8 shows time charts explanatory of the operation of the example shown in FIG. 7.

With reference to FIGS. 7 and 8, the construction and operation of the primary memory 23 will be described together with the peripheral circuits 30, 3 and 35, for the case of reading the recorded information (e.g. trains (1) and (2)) from the magnetic tape 1. In FIG. 7, references (1), (2), (3), (4), (5), (6) and (8) are pulses trains respectively shown in FIG. 8 by the corresponding reference numerals. In FIG. 7, the primary memory 23 comprises five right-left shift registers 23-1, 23-2, 23-3, 23-4 and 23-5 for handling input codes of five unit parallel code configuration from the circuit 22 and the serial to parallel signal converter 30. A ring counter RC2 has a scale of $(2 + 2 + n + 2 + 2)$ as shown and counts clock pulses (5) at the output of an AND gate AND6. Flip-flop circuits FF5, FF6, FF7, FF8, FF9 are set by corresponding output terminals s of the ring counter RC2 and reset by corresponding output terminals r of the ring counter RC2 and an AND gate AND7. In operation, if the write/read magnetic head 3 starts the left to right sweep to read in the same direction the recorded pulse train 1, the recorded pulse train 1 is read out as shown in FIG. 6 and 8. In this case, since the flip flop circuit FF7 has been set in response to the last bit $A_0$ (or $B_0$) of the last output pulse train 2 or 1, the ring counter RC2 and the flip flop circuit FF7 are reset in response to the first bit $A_0$ of state "1", which passes through an AND gate AND7 opened. The flip flop circuit FF8 is set as shown by a pluse 3 in response to the first bit $A_0$ of the state "1", so that a limited number of clock pulses 5 are obtained from clock pulses 4 at an opened AND gate AND6 to control the ring counter RC2. Since the first bit $A_0$ has been used as the reset pulse of the ring counter RC2, this ring counter RC2 counts the limited clock pulses 5 from the second one thereof. The flip flop circuit FF5 is set in response to the second pulse of the limited clock pulses 5, so that two clock pulses pass through an AND gate AND11 opened by the set output of the flip flop circuit FF5. The flip flop circuit FF9 successively assumes the state "1" and state "0" in response to the two clock pulses, so that AND gates AND4 and AND5 are successively opened in synchronism with the bits $A_1$ and $A_2$ respectively. When the AND gate AND4 is opened, the bit $A_1$ of the state "1" is set to the flip flop circuit FF10, while the bit $A_2$ of the state "0" is set to the flip flop circuit FF10 when the AND gate AND5 is opened. In this case, an output of an AND gate AND10 is obtained to designate the left to right shift direction of the shift registers 23-1 to 23-5. After two bits of state "0" from the bit $A_2$, the flip flop circuit FF6 is set, so that an information pulse train 7 is applied to the serial to parallel signal converter 30 through an AND gate AND8 opened by the output pulse 6 of the flip flop circuit FF6. The signal converter 30 receives the information pulse train 7 in synchronism with clock pulses 4 and applies read codes of parallel signal configuration by different timing to the shift registers 23-1 to 24-5. The shift registers 23-1 to 23-5 shift in the left to right direction as designated by the output of the AND gate AND10 to store therein in the parallel signal configuration the output codes of the signal converter 30. The flip flop circuit FF7 is set as mentioned above in response to the last bit $A_0$ of the pulse train 1, so that the above initial condition is again obtained.

When the magnetic head 3 then travels from the right to left direction, a pulse train 2 shown in FIGS. 6 and 8 is obtained from the magnetic head 3. Operations of this case can be readily understood by analogy with the above operation, details thereof are omitted. However, the shift registers 23-1 to 23-5 are designated to shift in the right to left direction by the output of an AND gate AND9, which is controlled by the states "01" of the flip flop circuit FF10 in this condition in response to the bits $B_1$ and $B_2$ of the states "01".

Accordingly, readout codes are stored in the shift registers 23-1 to 23-5 in the parallel signal configuration in the correct order of shift direction corresponding to the travelling direction of the magnetic head in view of the indication bits $A_0$, $A_1$, $A_2$, $B_0$, $B_1$ and $B_2$.

As has been described in the foregoing, in the magnetic recording and reproducing device of this invention, since information codes are recorded on the magnetic medium in the forward direction and the backward direction of its widthwise directions, the area of the magnetic medium is efficiently utilized to permit recording of large amount of information signals. Further, information recording and reproducing by using both the forward and backward sweeps of the reciprocating motion of magnetic heads are performed accurately. In addition to the above advantages, the present recording and reproducing device has such advantages as efficient mechanical operations of the mechanical parts, and improvement of an access time to a desired address. And, the device of this invention can be widely used as a terminal equipment of data communication or a peripheral equipment of an electronic computer.

What we claim is:
1. A magnetic recording system, comprising:
   magnetic record medium, having a transverse width dimension, for successively recording codes, block by block, thereon along the transverse width dimension;
   magnetic head means magnetically coupled with said magnetic record medium for recording said code blocks on the magnetic record medium and for reading out said recorded code blocks from the magnetic record medium;
   head drive means operatively coupled to said magnetic head means for reciprocating said magnetic head relative to said magnetic record medium and widthwise thereof;
   primary memory means including a plurality of primary right-left shift registers for storing, block by block, codes in a parallel signal configuration;
   input means connected to said primary memory means for applying input codes to said primary right-left shift registers in the parallel signal configuration;
   secondary memory means including a plurality of secondary right-left shift registers connected to said primary right-left shift registers of said primary memory means for storing, block by block, in the parallel signal configuration codes transferred from said primary right-left shift registers;
   detection means for detecting a sweep direction of said magnetic head means relative to the magnetic record medium widthwise of the magnetic record medium;
   first shift-control means connected to said secondary memory means and said detection means for shifting the code blocks stored in said secondary right-left shift registers in either the right shift direction or the left shift direction in accordance with the sweep direction of the magnetic head means detected by said detection means so the shift direction of the code blocks conforms with the sweep direction of said magnetic head means;
   first connection means between the outputs of said secondary right-left shift registers and said magnetic head means for applying, block by block, read-out codes from said secondary right-left shift registers to said magnetic head means for recording a read-out code block on the magnetic record medium during each widthwise sweep of the magnetic head means.

2. A magnetic recording system according to claim 1, in which said first shift control means comprises a first register and a second register operatively connected to said detection means for storing indication bits indicative of said sweep direction of said magnetic head means in accordance with the sweep direction detected by said detection means, and control means for adding contents of said first register and said second register at preceding time slots just preceding and just succeeding each block of said read-out codes, respectively, so as to distinguish between said each block of said readout codes.

3. A magnetic recording system according to claim 1, wherein said first shaft control means adds control bits to the read-out codes which indicate the sweep direction of said magnetic head means, and further including second connection means between the output of said magnetic head means and inputs of said primary right-left shift registers of said primary memory means for applying, block by block, read-out codes from said magnetic head means to said primary right-left shift registers;
   second shift control means connected to said primary right-left shift registers and said second connection means for shifting the code blocks stored in said primary right-left shift registers in either the right shift direction or the left shift direction in accordance with the states of control bits added to said read-out codes so the shift direction of the code blocks conforms with the sweep direction of said magnetic head means; and output means connected to said secondary memory for obtaining output codes from said secondary memory.

4. A magnetic recording system according to claim 3, in which said second shift control means comprises binary circuit means for assuming one of two possible states to indicate either the right shift direction or the left shift direction in accordance with the states of said control bits added to said readout codes so the state of the binary circuit means conforms with the sweep direction of said magnetic head means, and means connected to said second connection means and said binary circuit means for detecting said control bits from said readout codes to apply the detected control bits to said binary circuit means.

5. A magnetic recording system according to claim 1, further including line printer means responsive to code signals and having type for printing characters represented by the codes in a line format, reversible shift registers connected to said printer means for shifting in a parallel signal configuration codes arranged in respective correspondence with type of the line printer means so as to be representative of respective corresponding characters, comparator means including a plurality of comparators connected to said secondary right-left shift registers of said secondary memory means and said reversible shift registers to generate at each comparator a control pulse at each coincidence between two compared codes respectively from said reversible shift registers and said secondary right-left shift registers, and means for applying output pulses of said comparators to said line printer means to print characters corresponding to said coincidence in a line format.

* * * * *